March 15, 1966  H. A. CALLENDAR  3,240,048
METHOD AND APPARATUS FOR BINDING PIPE
Filed Aug. 8, 1962  2 Sheets-Sheet 1
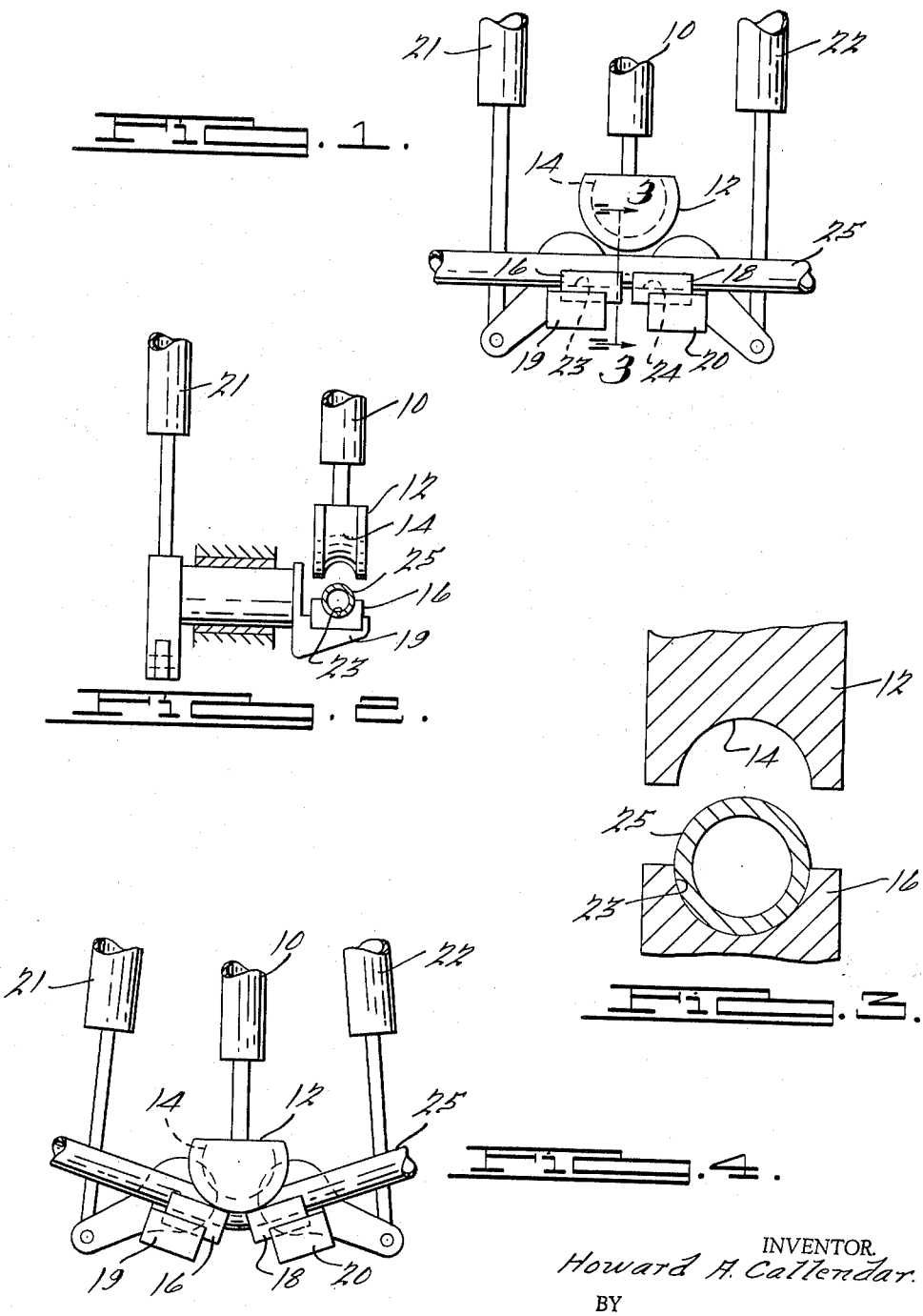
INVENTOR.
Howard A. Callendar.
BY
Harness, Dickey & Pierce
ATTORNEYS.

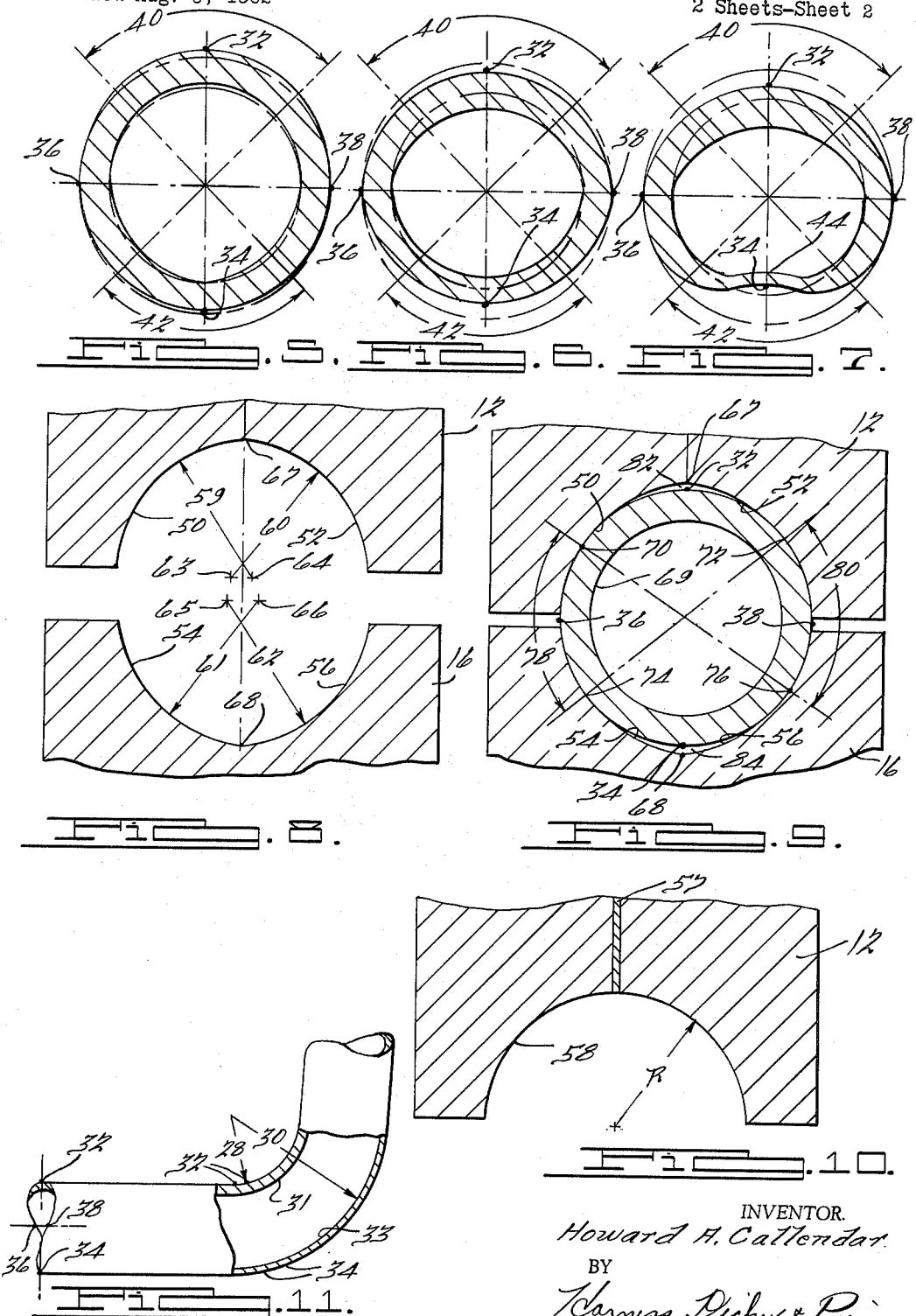

United States Patent Office 3,240,048
Patented Mar. 15, 1966

3,240,048
METHOD AND APPARATUS FOR BENDING PIPE
Howard A. Callendar, Grass Lake, Mich., assignor to Walker Manufacturing Company, Racine, Wis., a corporation of Delaware
Filed Aug. 8, 1962, Ser. No. 215,601
6 Claims. (Cl. 72—369)

This invention relates to pipe bending and more particularly to the manufacture of exhaust and tail pipes for vehicles.

In the manufacture of exhaust pipes for vehicles, many complicated and intricate bends are formed in the pipe, after manufacture thereof in a straight form, to permit installation of the pipe in and around vehicle undercarriages. One method of bending the pipe is conventionally accomplished with bending machinery comprising a reciprocable ram and a pair of rotating wing dies which are cooperatively actuated to attain a predetermined amount of bend in a pipe in a particular angular relationship relative to the rest of the pipe and the other bends in the pipe. In previous practice, such pipe bending apparatus has been designed to apply uniform pressures about the periphery of the pipe in the area of bend during the bending operation. To this end, the pipe bending dies have had pipe contact surfaces formed by substantially cylindrical curvatures adapted to correspond to the outer peripheries of the pipe to be bent.

As a straight length of pipe is bent to form a bend having a particular angulation, portions of the pipe wall are stretched under tension to attain an arcuate length in the bent position which is substantially longer than the length of the same pipe surface in the straight condition. Similarly, the opposite portion of the pipe is placed in a state of compression by the bending operation. The compression and tension effects attained along the surfaces of the pipe during the bending operation are well illustrated by the resulting tendency of the pipe to return to its original position, which is commonly known as spring-back.

In the bending of pipe with conventional apparatus and methods, another common result is a reduction in cross sectional area of sections of the pipe in the area of bend. The internal diameter of the pipe, and consequently the volume, in the area of bend is reduced considerably by most bending operations. The reduction in diameter and volume obtained during the bending operation is such a well known phenomena and so continually attained in bending operations with conventional bending apparatus and methods that pipe purchasers ordinarily specify, as part of the tolerances for the manufacture of the pipe product, a maximum permissible percent reduction in internal diameter. The percent reduction in volume is commonly specified as a tolerance of approximately 12% reduction of original internal diameter.

In addition to the decrease in diameter of the pipe in the area of bend, the wall thickness of portions of the pipe is changed to a significant degree. Some portions of the pipe wall are increased in thickness and some portions are decreased in thickness. A reduction in the thickness of the pipe wall is particularly critical in vehicle exhaust systems where pipe corrosion in thin wall areas may result in rapid deterioration of the pipe. Furthermore, the effects of tensile and compressive forces and the variations in thickness of the pipe in the area of bend may also cause wrinkling of the pipe wall. The pipe wrinkles are unsightly and in addition may produce harmful results in that the wrinkles form pockets wherein corrosive materials and moisture are likely to gather and increase the rate of deterioration of the pipe in use. The acoustic properties of the pipe may also be seriously impaired by the wrinkles.

The present invention is particularly useful in bending a laminated pipe. It has been proposed to produce a laminated pipe by the simple expedient of inserting a length of straight small diameter pipe within a length of straight larger diameter pipe in a telescopic relationship. In order to secure the telescoped pipes within one another, it has been proposed to rely fully on subsequently formed bends in the pipe to permanently secure the pipes to one another in the telecoped position. Furthermore, it is desirable to maintain a particular spacial relationship between the inner pipe and the outer pipe in the bent condition for maximum sound-deadening effect and maximum wear characteristics. With the present bending apparatus and method, it is possible to bend a laminated pipe formed by telescoped pipe sections into a wide variety of shapes and still maintain the specified tolerances and spacial relationships.

Accordingly, it is the principal object of the present invention to provide new and improved means and methods for bending pipe.

Another object of the present invention is to provide a means and method for bending laminated pipe.

A further object of the present invention is to provide pipe bending means which will result in better control of pipe diameter reduction in the area of bend.

Still another object of the present invention is to provide pipe bending means with which pipe wrinkling in the area of bend will be substantially eliminated.

An additional object of the present invention is to provide means for bending pipe which results in a pipe having more uniform wall thickness about the periphery of the pipe in the area of bend.

A still further object of the present invention is to provide die apparatus for use with a pipe bending machine which will apply bending forces to the periphery of a pipe during a bending operation in an optimum pattern producing more satisfactory bends than previous apparatus.

The aforementioned objects and others have been attained by the application of the inventive principles of the present invention in an illustrative embodiment of the invention as hereinafter described in detail by reference to the accompanying drawings wherein:

FIGURE 1 is a side elevational view of apparatus for bending pipe;

FIGURE 2 is an end view of the apparatus shown in FIG. 1;

FIGURE 3 is taken along the line 3—3 in FIG. 1 showing a conventional die cavity configuration;

FIGURE 4 is a side elevational view of the apparatus shown in FIG. 1 in a pipe bending position;

FIGURE 5 is a typical section taken in the area of bend along the lines 5—5 in FIG. 4 of a pipe slightly bent by conventional apparatus and methods;

FIGURE 6 is another typical section taken in the area of bend of a medium pipe bend obtained by conventional apparatus and methods;

FIGURE 7 is another typical section taken in the area of bend of a maximum pipe bend obtained by conventional apparatus and methods;

FIGURE 8 is a cross sectional view of bending die apparatus incorporating the principles of the present invention;

FIGURE 9 is a sectional view taken through the dies of FIG. 8 showing the relationship thereof with a pipe supported therein for a bending operation;

FIGURE 10 is a sectional view of a conventional circular die showing a method of forming a die cavity in accordance with the invention; and FIGURE 11 is a side elevational view, partly in section, illustrating a section of bent pipe for reference purposes.

Referring now to FIGS. 1–4, conventional bending apparatus, comparable to U.S. 2,887,141, for forming bends in lengths of pipe is illustrated. The bending apparatus comprises a reciprocating mechanism 10 which actuates a semi-cylindrical ram die portion 12. The die portion 12 is provided with a die cavity 14 formed by a groove having a semi-cylindrical cross section and extending around the ram die substantially 180°.

Wing dies 16, 18 are provided below and on each side of the ram. Rotatable brackets 19, 20 support the wing dies for movement relative to the ram to provide an upward wiping action around the periphery of the ram in response to actuation of reciprocating mechanism 21, 22. The wing dies 16, 18 are provided with similar die cavities 23, 24 formed by semi-cylindrical grooves. A section of pipe 25 to be bent is shown supported within the die cavities prior to a bending operation in FIGS. 1–3. In operation of the apparatus the ram die 12 moves downwardly and the wing dies 16, 18 pivot downwardly therearound to form the desired bend in the pipe as shown in FIG. 4. The movement of the ram die and wing dies is controllable to vary the angle of the bend obtained.

As may be seen in FIG. 3, the cross sectional configuration of the die cavities which engage the outer surface of the pipe are cylindrical in form and adapted to have uniform peripheral contact about the periphery of the pipe during a bending operation. Consequently, the application of forces to the periphery of the pipe is substantially uniform. Some typical bend results attained by conventional apparatus are shown by pipe sections taken through the area of bend in pipes having progressively greater bend angles. Each area of bend of a pipe is defined by an innermost radius 28 and an outermost radius 30. Referring now to FIG. 11, the innermost and outermost points 32, 34 on the periphery of the pipe in the area of the bend are located opposite one another and lay along arcs having radii 28, 30. The pipe is subjected to maximum compressive forces along a line 31 drawn by the radius 28 through points 32 and to maximum tensile forces along a line 33 drawn by the radius 30 through points 34. The side surfaces of the pipe have minimal stress and the points 36, 38 are located along lines of substantially zero stress. One area 40 of the cross section of the pipe along the inner radius 28 of the bend is typically formed into a substantially elliptical shape while the other opposite area 42 of the pipe along the outer radius 30 of the bend is progressively flattened as shown in FIGS. 5–7 and in some bending operations acquires a concave dimple or collasped area 44 in the central portion as shown in FIG. 7. The surface of the pipe along the outer radius of the bend is stretched and reduced in wall thickness which results in the collapsed area 44. The walls of the pipe vary substantially in thickness around the periphery of the pipe due to the forces exerted thereon during bending. Furthermore, the stretching of the pipe in the area of the bend causes a flow of metal and a substantial reduction in the cross sectional area of the pipe. As an example of the metal flow in the pipe during a forming operation with conventional equipment, experiments have shown that a 2″ pipe having a wall thickness of .048 inch may vary, after the bending operation, from a minimum thickness of .030 inch to a maximum of .055 inch. The wall thickness at the sides 36, 38 of the pipe remain at approximately .048 inch and progressively increase to a maximum of .055 inch at 32 and progressively decrease to a minimum of .030 inch at 34.

The reduction in wall thickness at the point 34 tends to cause inward collapse of the wall and the increase in thickness at the points 32 tends to cause wrinkles and buckling. In the present invention the tendency of the pipe to collapse in the area of maximum tensioning is completely eliminated and the tendency to buckle or wrinkle is greatly reduced. Furthermore, the wall thickness of the pipe in the area of bend, tends to remain more uniform and the percent reduction in volume or cross sectional area in the area of bend is substantially lessened. The present invention contemplates the provision of non-circular, discontinuous and intersecting die cavity surfaces 50, 52 or 54, 56 which are formed to have a somewhat dome shaped configuration as shown in FIG. 8, rather than a configuration adapted to match the original cylindrical shape of the pipe.

The desired shape of the die is conveniently attained by slicing a section 57 from the center of a die having an original circular cavity 58 as shown in FIG. 10. In this manner, the two curved sections 50, 52 and 54, 56 of the dies 12, 16 are formed by separate radii 59, 60 and 61, 62 having spaced centers 63, 64 and 65, 66. Consequently, the die cavity surfaces 50, 52 and 54, 56 intersect at acute angles at 67, 68.

When a straight section of cylindrical pipe 69 is placed in the die cavities, as shown in FIG. 9, substantially line contact is obtained with the outer pipe wall at four space locations 70, 72, 74 and 76. The side walls of the die cavities in the areas 78, 80 between the locations of line contact 70, 72 and 74, 76 are located closely adjacent the pipe wall in substantially continuous surface engagement during a bending operation. The side walls of the cavities taper outwardly away from the pipe wall at the inner and outer bend radius areas 32, 34 to maximum gaps 82, 84 at the side wall intersections 67, 68. Good results may be obtained when only the ram dies are formed in the aforedescribed manner and particularly advantageous results may be obtained when the wing die is also similarly formed.

As may be seen in FIG. 9, the application of force to the pipe during the bending operation is no longer uniformly distributed over the surface of the pipe 69 with dies having the cavity configurations of FIG. 8. With such apparatus the application of force is concentrated in the areas indicated at 70, 72, 74, 76. These areas are located approximately midway between each of the quadrants of a cross section of the pipe defined by the points 32, 34, 36, 38. In most cases the application of force will be somewhere near the centers of each quadrant or spaced toward the central or zero force lines 36, 38. By applying force in this manner, metal in the pipe is caused to flow from the side pipe surfaces adjacent the side surfaces of the die cavity toward the upper or lower pipe surfaces adjacent the points 32, 34. The shape of the die cavities provide pockets 82, 84 into which the metal may flow. In the wing dies, the metal flows toward those areas of the pipe which previously have had maximum reduction in pipe thickness. Accordingly, the material of the pipe which is being displaced during the bending operation by the compressive and tensile forces therein is simultaneously being replaced by material from the side surfaces of the pipe which are less subject to tension and compression than the bottom and top surfaces. Similarly, the ram die cavity 14 is provided with a flow pocket 82 into which excess material may flow and which prevents the formation of buckling or wrinkling due to excessive compressive forces.

Accordingly, the material of the pipe is apparently redistributed from those areas which are least subject to the effects of compression and tension during the bending operation to those areas which are maximumly effected. Consequently, pipe bent by dies embodying the principles of the present invention have a more uniform cross sectional configuration so that the reduction in volume of the pipe in the area of bend is substantially reduced. Furthermore, thin-walled sections of the pipes are eliminated in the outer area of bend and in addition the pipe is substantially wrinkle free along the inner area of bend.

The inventive principles have been hereinbefore disclosed by reference to the presently preferred embodiment for illustrative purposes, but the invention is obviously not limited to the illustrative embodiment and may be other-

The invention claimed is:

1. A method of bending pipe comprising the steps of mounting the pipe in bending die means, applying forces to the periphery of the pipe through the bending die means at peripherally spaced locations thereabout, and directing flow of the pipe material to areas of the pipe subject to maximum compression and tension during the bending operation.

2. The method of bending pipe comprising the steps of positioning the pipe for a bending operation, applying bending pressure to the pipe at spaced locations, and displacing pipe material from those areas least subject to the effects of compression and tension during the bending operation to those areas subject to maximum compression and tension.

3. The method of bending pipe comprising the steps of mounting the pipe in bending die means for bending movement in one direction, applying bending pressure to the pipe at four spaced areas located approximately midway between each of the quadrants of a cross section of the pipe at the area of bend, and displacing pipe material from the side pipe area to which the bending pressure is being applied toward areas intermediate the four spaced areas including the area of maximum bend to reduce thinning of the pipe wall.

4. The method of bending pipe comprising the steps of mounting said pipe in bending die means, positioning separate side wall portions of said die means in initially substantially line contact with the outer wall of the pipe at four spaced locations, applying bending forces to the pipe through said die means and forcing the side wall portions of said die means between the locations of initial line contact into engagement with the outer wall of the pipe and thereby increasing the area of contact between the side wall portions of said die means and the outer wall of the pipe, and during the bending operation establishing a spaced relationship between parts of the side wall portions of said die means and the outer wall of said pipe at the inner and outer pipe bend radius areas such that parts of the side wall portions of the die means beyond the areas of contact with the outer wall of the pipe are spaced outwardly away from the pipe wall at the inner and outer pipe bend radius area to define maximum gaps between the die means and the pipe wall 5. Die means for bending pipe, said die means being made from two sections, each of said sections having arcuate bending surfaces, and said arcuate bending surfaces having spaced centers and a constant radius of curvature and forming a flow pocket therebetween.

6. Die means for bending pipe, said die means having a non-circular die cavity defined by two opposite curvilinear surfaces having spaced centers and intersecting at an angle defining a flow pocket, each surface having only one center of curvature, and said surfaces being adapted and arranged to produce force applying engagement with said pipe along the side surfaces of said pipe extending between the top and bottom surfaces thereof to direct flow of pipe material into the flow pocket.

References Cited by the Examiner

UNITED STATES PATENTS

| 1,688,199 | 10/1928 | Meier | 153—46 |
| 2,983,995 | 5/1961 | Gresse | 153—33 |

FOREIGN PATENTS

| 1,099,859 | 3/1955 | France. |
| 808,320 | 2/1959 | Great Britain. |

CHARLES W. LANHAM, *Primary Examiner.*